United States Patent Office

3,763,084
Patented Oct. 2, 1973

3,763,084
POLY(DIACETONE ACRYLAMIDE) MODIFIED CALCIUM CARBONATE
Gabriel Michael Grudus, Jr., Randolph, and Stanley E. Gebura, Mountain Lakes, N.J., assignors to Interpace Corporation, Parsippany, N.J.
No Drawing. Filed Jan. 14, 1972, Ser. No. 217,977
Int. Cl. C08g 51/04
U.S. Cl. 260—40 R      8 Claims

ABSTRACT OF THE DISCLOSURE

A process has been provided for polymerizing diacetone acrylamide monomer and a comonomer system based on diacetone acrylamide monomer onto a particulate calcium carbonate; this process may be carried out in an aqueous phase; the monomers or comonomers are polymerized via free radical polymerization onto the surface of calcium carbonate; when calcium carbonate is modified with diacetone acrylamide homopolymer, it possesses improved properties; by employing diacetone acrylamide as one of the monomer precursors in a comonomer system but by varying the amount of comonomer, modified calcium carbonate is obtained which possesses especially advantageous properties; products prepared by this process are within the scope of the invention as are the uses of these surface modified products for purposes as adjuvants in polymers, e.g. poly(ester), poly(vinyl chloride) and in oleaginous, alkyd, adhesive, paint, putty, caulking and grouting composition formulations, to name a few.

This invention relates to a process for preparing modified calcium carbonate by polymerizing diacetone acrylamide as a homopolymer or copolymer onto surfaces of said calcium carbonate. A product obtained by the practicing of this process is within the scope of the invention as are the uses of this product such as in combination with poly(ester), oleaginous, paint, poly(vinyl chloride), and alkyd as well as adhesive, caulking, putty and grout compositions.

BRIEF DESCRIPTION OF THE INVENTION

According to the process described herein, calcium carbonate such as in the form of fine white amorphous powder or in fine particulate form or in the conventionally available fine powdered rhombohedra form are suitable for use in the process.

The calcium carbonate is treated with the diacetone acrylamide or its comonomer system to polymerize onto the surface of the calcium carbonate the monomer or comonomer and thus form a homopolymer or copolymer.

BACKGROUND OF THE INVENTION

A major reason for modifying calcium carbonate is the relative availability of this low-cost material, and thus the attendant economic advantages of this material is evident when it is employed as an adjuvant or substitute for a more scarce or expensive material. Another major reason for modifying calcium carbonate is the extremely small particles which are useful for bodying various materials. These particles may be obtained by appropriately working up the naturally occurring calcium carbonates by various processes well known to the art. Thus, if these small particles are admixed with various liquids, a pronounced bodying effect is obtained. Hence, for this purpose properly modified calcium carbonate is useful in fluids such as paints, greases, coatings, oils, adhesive and grouting compositions, etc.

A primary reason for modifying the surface of calcium carbonate is to make it useful for the above purposes because its surface exhibits hydrophilicity and organophobicity. Hence, to render calcium carbonate useful in materials which are classified as organic compounds, the object is to make calcium carbonate at least organophilic. Obviously, depending on the material to which calcium carbonate will be added, various modifications are possible and will become evident as further described herein.

THE PRIOR ART

A number of processes have been disclosed in the prior art for modifying siliceous materials with compounds possessing ethylenically unsaturated moieties. An example in U.S. Patent 3,557,038 to Stanley E. Gebura and assigned to present assignee. However, based on the understanding of the surface chemistry, the fact that calcium carbonate could be modified by polymerizing onto its surface diacetone acrylamide was highly surprising and unexpected because siliceous surfaces have "active" sites whereas calcium carbonate surfaces were understood as not having any "active" sites.

Despite the various processes and products which have been proposed in the prior art such as recited in said U.S. Patent 3,557,038, it is still impossible to predict whether or not the physical and chemical properties of calcium carbonate surface polymerizates will be acceptable. Merely as an example, it is still impossible to foretell what viscosity characteristics or the magnitude thereof will be displayed by a surface modified calcium carbonate particulate in oil or in a poly(ester) and the energy expenditure needed to disperse the modified particulate material in said medium. Thus, when added to an oleaginous fluid, various copolymer modified calcium carbonates increase the viscosity while other copolymer systems decrease the viscosity in reference to the same but unmodified calcium carbonate added to the fluid.

DESCRIPTION OF THE INVENTION

It has been found that surfaces of calcium carbonate can now be modified in an unexpectedly advantageous manner by reacting calcium carbonate with diacetone acrylamide for forming a homopolymer on the surface of calcium carbonate or reacting calcium carbonate with diacetone acrylamide and another monomer for forming a copolymer on the surface of calcium carbonate.

Heretofore, it has not been proposed to modify calcium carbonate by employing diacetone acrylamide monomer or comonomer systems based on diacetone acrylamide as polymerizate producers on surfaces of calcium carbonate. Moreover, it was highly unexpected that diacetone acrylamide would impart beneficial properties to calcium carbonate even when used in small proportions in respect to other comonomers.

The above-described homopolymerizate or copolymerizate system possesses especially advantageous properties derived from the unique but unknown interaction of the diacetone acrylamide moiety with the calcium carbonate surface. Moreover, the diacetone acrylamide copolymers while capable of polymerization onto the calcium carbonate surface from an aqueous dispersion will form organophilic products depending, of course, on the comonomer used. Still further, diacetone acrylamide undergoes polymerization and also apparently crosslinking on the surface of calcium carbonate.

Besides the highly unexpected properties possessed by the above-described modified calcium carbonate, the process by which this material is produced is especially noteworthy. Thus, the polymerization is advantageously carried out in an aqueous medium, the handling of this medium is especially facile and the calcium carbonate modification process is especially attractive from industrial point of view.

By varying the component parts of the comonomer system, modified calcium carbonate may be obtained which may possess highly desired bodying properties heretofore achieved via different routes with more expensive materials. Unexpectedly, calcium carbonate modified with different diacetone acrylamide copolymers differs based on the polymerizate while still retaining the desired properties. Obviously, this unexpected variation in the properties allows the obtention of modified calcium carbonate which meets specified requirements based on compatibility, viscosity, bodying effect, etc.

Although calcium carbonate is available in many forms, in general a pure (white) form of it is preferred. An example of such a material is sold under the trademark Atomite by Thomas, Weinman & Co., Cartersville, Ga., and available in an average particle size of 2 to 5 microns and a "dry brightness" of 95%. Calcium carbonate particulate available in its various forms may be employed. Examples of calcium carbonate forms are calcite, vaterite, travertine, marble, chalk, argonite, etc. In general, the particle size of the material may range from submicron (less than one micron) to 40 micron size, with the range from 2 to 10 being preferred. However, calcium carbonate of an average particle size of up to 200 mesh (through) may be employed.

As indicated previously, the diacetone acrylamide monomer and a combination of this monomer with appropriate comonomers have been unexpectedly found to permit modification of the physical properties of calcium carbonate. Moreover, this invention has been predicated on the unexpected discovery that polymerizing diacetone acrylamide on a calcium carbonate surface produces a tenaceously bound polymerizate on the surface, even when the proportions of diacetone acrylamide such as in a copolymerizate constitutes a small proportion thereof. Hence, the over-all properties of calcium carbonate can be modified in a far-reaching manner. Thus, despite the fact that the major part of the polymerizate is derived from a monomer consisting, e.g. from 60% to 99% of a comonomer other than diacetone acrylamide, a mere addition, say as little as 2%, of diacetone acrylamide vastly changes the properties of the thus modified calcium carbonate surface.

It is obvious that the above properties are based on the use of diacetone acrylamide as the essential component in the comonomer system to achieve the particular coaction with the other comonomer and with the calcium carbonate. Because of the peculiar and surprising coaction of diacetone acrylamide with the calcium carbonate surface and another comonomer, the poly(comonomer) is not readily displaced by solvents or reagents in systems to which the calcium carbonate may be added as an adjuvant or extender.

A suitable comonomer in the diacetone acrylamide polymer system is a monomer which is capable of polymerizing together with the diacetone acrylamide. Representative comonomers are: vinyl acetate, vinyl chloride, acrylonitrile, maleic anhydride, acrylic and methacrylic esters of 1 to 8 carbon atoms in the ester moiety, acrylic and methacrylic acid, vinylidene chloride, butadiene, isoprene, and styrene.

The preferred combination of the described diacetone diacrylamide comonomer systems is based on styrene.

The proportions of comonomers to diacetone acrylamide are 99:1 to 1:2, with 98:2 to 1:1 being the narrower range. Generally, the practical range is from 98:2 to 3:1.

In the polymerization step, peroxidic initiators are used. Such peroxidic initiators include hydrogen peroxide; persulfates such as ammonium, sodium or potassium persulfate; hydroperoxides such as t-butyl hydroperoxide, diisopropylbenzene hydroperoxide, cumene hydroperoxide, 1-phenylethylhydroperoxide, etc.; diacylperoxides such as benzoyl peroxide, acetyl peroxide and the like; dialkyl peroxides such as di-t-butyl peroxide, dicumyl peroxide, etc.; presters such as t-butyl peroxyacetate, t-butyl peroxybenzoate and the like; peracids such as performic acid, peracetic acid, perbenzoic acid, peroxylactic acid and the like; and other such as dialkyl peroxydicarbonates, azobisisobutyronitrile and the like. The persulfates such as potassium persulfate are the preferred initiators. These peroxy compounds must be capable of initiating a free radical polymerization by themselves or in the presence of an activator such as a reducing agent.

DESCRIPTION OF THE PROCESS

The reaction is conveniently carried out in a reaction vessel, provided with a stirrer, and, optionally, with an inlet for an inert gas such as nitrogen. An appropriate amount of calcium carbonate such as Atomite (described above) is dispersed in de-ionized water (obtained by using commercial ion-exchange resins) and is introduced into the vessel. A ratio of 1:1 to 10:1, generally 1:1 to 3:1, water to calcium carbonate on weight basis is suitable; a preferred range is 25 to 45% of solids. To this dispersion is added an initiator of the above-described class in an amount from 0.1% to 2.0% based on the amount of introduced monomers to be used. Thereafter, diacetone acrylamide or diacetone acrylamide and a comonomer are added. The initiator may be added concurrently with the monomers. In general, the reaction is conducted in aqueous solution from room temperature on up to about the temperature of the particular dispersion as limited by the temperatures suitable for the above-mentioned initiators, generally from room temperature up to a temperature of 125° C. The higher temperatures may require different solvent systems. As it is well known in the art, the temperatures employed are those at which the free radical initiator readily causes polymerization to take place, and for the potassium persulfate it is about 70° C.

A polymerizate of diacetone acrylamide may also be formed on the surface of calcium carbonate when the monomer itself is employed as the liquid medium. The total mixture is reacted for a period which will depend upon the temperature and added monomer or comonomer involved, but will generally range from 1 to 10 hours, preferably 3 to 5 hours. Following this reaction, the modified calcium carbonate is recovered by filtration and drying below the temperature at which the modified product decomposes. Thereafter, the product is pulverized and incorporated as an adjuvant in one of the described materials, e.g. polyester.

Advantageously the process may be carried out by adding a solution of the monomer or comonomers and initiator to the calcium carbonate in a suitable blender and subsequently polymerizing the monomers and drying the modified calcium carbonate.

Based on practical considerations, the amount of polymerizate addition is from 0.2% to 5% or even up to 10%. However, generally an addition of polymerizate from 0.5% to 2%, based on weight of calcium carbonate is a practical range. More importantly, this addition is achieved with little, if any, loss of homopolymer or copolymer formation in the solution.

In order to describe the present invention so that it may be more clearly understood, Examples 1 and 2 illustrate the invention. In these examples, all parts are expressed in parts by weight unless otherwise stated. The examples are set forth primarily for the purpose of illustration, and any specific enumeration of detail contained therein should not be interpreted as a limitation on the concept of this invention.

EXAMPLE 1

In a one-liter flask, fitted with a stirrer and a nitrogen inlet, a dispersion of 100 g. calcium carbonate in 400 ml. of de-ionized water was prepared. To the dispersion was added three ml. of one percent potassium persulfate solution followed by two grams of diacetone acrylamide. The mixture was heated at 70° C. ±2° during 3.5 hours while nitrogen was continually swept over the reaction mixture. The mixture was cooled, filtered, dried and pulverized.

EXAMPLE 2

In a similar experiment as described in Example 1, using the same initiator, calcium carbonate (Atomite, previously described) was modified by in situ polymerization yielding 4 parts polymerizate per 100 parts of calcium carbonate, the polymerizate being derived from a mixture comprising 98 parts of styrene and 2 parts diacetone acrylamide.

A polyester composition for forming glass fiber reinforced shapes was blended in the following proportions: 60 parts calcium carbonate as modified in Example 2 above, 20 parts of glass fibers (chopped) and 20 parts of Polyester A were blended in a Brabender; a torque reading derived therefrom when mixing the above composition was 315–600; when untreated calcium carbonate was used the torque reading derived therefrom under identical conditions was 600–1300.

The polyester A is a general purpose polyester resin of phthalic acid with maleic acid or fumaric acid added thereto and an alkylene glycol such as ethylene glycol as the glycol component. The glycol is modified with an appropriate triol for purposes of cross-linking the ester; additionally, styrene is added to the ester to effect cross-linking through the ethylenically unsaturated bond of the di-basic acid and the vinyl group of styrene monomer. The amount of styrene in the ester may also be varied.

When calcium carbonate as modified in Example 2 was dispersed in a polyester, it provided a mixture having a considerably lower viscosity than when untreated calcium carbonate was used at the same conditions.

Similarly, when calcium carbonate was treated with diacetone acrylamide according to Example 1, it yielded a product having a lower dispersion viscosity in Nujol when compared to an untreated product admixed to Nujol under the same conditions.

As mentioned before, the modified calcium carbonate is suitable for polyester dispersions as adjuvant therein.

The liquid unsaturated polyester resins employed in producing improved molding compositions of this invention are obtained by reacting together a dihydric alcohol and a di-basic acid, either of which contains a pair of double bonded carbon atoms. The unsaturated long chain polyester molecule is essentially linear and is capable of being cross-linked to form a solid, thermosetting resin through the double bonds in the ester. A liquid unsaturated monomer, such as styrene, is employed as a cross-linking solvent, and an organic peroxide is usually employed to initiate the cross-linking reaction. These unsaturated polyesters are characterized by thermosettig without evolution of water. Commercially available unsaturated polyester resins usually contain a mixture of unsaturated polyesters and unsaturated monomeric solvent.

Polyols used in the preparation of commercial polyesters include: ethylene glycol; propylene glycol; 1:3 butylene, 2:3 butylene and 1:4 butylene glycols; diethylene glycol and triethylene glycol, to name the most common ones.

Maleic anhydride and fumaric acid are the most frequently used unsaturated acids in the preparation of unsaturated polyesters; maleic acid is used to a lesser extent. Other suitable unsaturated acids are citraconic acid, mesaconic acid, itaconic acid and 3:6 endomethylene tetrahydro phthalic anhydride. Equimolal proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances trihydric alcohols, such as glycerine or castor oil, or higher alcohols, such as pentaerythritol or sorbitol, are used to modify the product.

Styrene, diallylphthalate and triallyl cyanurate are the principal cross-linking agents.

As mentioned before, the cross-linking reaction is initiated with a peroxide catalyst, usually benzoyl peroxide. Other initiators are methyl ethyl ketone peroxide and methyl isobutyl ketone peroxide.

Accelerators, stabilizers, promotors and coloring agents may be incorporated in the polyester whne desired, as well as auxiliary fillers and structural reinforcing agents such as fibrous asbestos, chopped glass fibers or compatible organic fibers.

In the preparation of moldable polyester mixes employing the novel modified calcium carbonate particulate, the particulate is added to the unsaturated liquid polyester resin in the same manner and with equipment usually employed for adding clay or other fillers to the resin.

Generally, the amount of adjuvant added to a polyester ranges from 10% to 200% based on the polyester; from 28% to 80% is the usual range, although from 40% to 50 % is the most common range.

Besides the above-demonstrated applications, calcium carbonate as modified according to this invention is also suitable for advantageous incorporation in poly(vinyl chloride) blends, paints, and alkyd base compositions as well as oleaginous, adhesive, caulking, paint, putty and grouting composition formulations. In this connection, the conventional testing procedures such as ASTM procedures used in these arts for proving the efficacy of the additives are employed in reference to the herein described adjuvants.

What is claimed is:

1. A fine, particulate calcium carbonate, said calcium carbonate having as a polymerization product on its surface, after admixture with and in situ polymerization with said calcium carbonate, a copolymer derived from diacetone acrylamide as one monomer and, as a comonomer for said diacetone acrylamide, styrene, said comonomer and diacetone acrylamide being in a ratio from 99:1 to 1:2.

2. The modified particulate according to claim 1 wherein the particulate is of a particle size from 2 to 5 microns.

3. A polymerizable polyester resin of a dibasic acid and a polyol, comprising as an adjuvant a finely divided particulate, the finely divided calcium carbonate particulate having surfaces thereof modified, after admixture with and in situ polymerization, with diacetone acrylamide and styrene as an ethylenically unsaturated comonomer for said diacetone acrylamide, in a ratio of said comonomer to diacetone acrylamide from 99:1 to 1:2, in an amount from 0.2% to 10% on basis of the weight of the dry particulate.

4. An oleaginous, alkyd, or poly(vinyl chloride) base material comprising as an adjuvant in an amount of up to 200%, a finely divided particulate of calcium carbonate, said particulate having a surface modified, after admixture with and in situ polymerization, with a polymerization product therewith of diacetone acrylamide and styrene as an ethylenically unsaturated comonomer polymerizable with diacetone acrylamide in an amount from 0.2% to 10% on basis of the weight of the dry particulate, said comonomer and diacetone acrylamide being in a ratio from 99:1 to 1:2, respectively.

5. A method of forming a finely divided organophilic particulate of calcium carbonate, said method comprising the steps of: adding an aqueous solution or aqueous dispersion of diacetone acrylamide and styrene as another ethylenically unsaturated comonomer to said particulate in a ratio of 99:1 to 1:2 of comonomer to diacetone acrylamide, respectively, reacting said diacetone acrylamide and styrene comonomer with the surface of the particulate in the presence of a peroxidic initiator at a temperature at or below the reflux temperature of the system; and recovering the particulate with the polymeric reaction product on the surface thereof and drying the same.

6. The process according to claim 5 wherein the particulate is of 2 to 5 microns, and the temperature at which the reaction is carried out is 70° C.

7. A polymerizable composition as defined in claim 3 and wherein the same contains an unsaturated diluent capable of reacting with said resin.

8. A polymerizable resin composition as defined in claim 3 and wherein the resin is dissolved in an unsaturated diluent capable of reacting with the same.

References Cited

UNITED STATES PATENTS

| | | | |
|---|---|---|---|
| 3,208,867 | 9/1965 | Weldes | 106—308 N |
| 3,557,038 | 1/1971 | Gebura | 260—40 R(X) |
| 3,014,810 | 12/1961 | Dybalski et al. | 106—308 N |
| 3,156,576 | 11/1964 | Te Grotenhuis | 106—308 N |
| 3,290,165 | 12/1966 | Iannicelli | 106—308 N |

ALLAN LIEBERMAN, Primary Examiner

S. M. PERSON, Assistant Examiner

U.S. Cl. X.R.

106—308 N; 260—37 R, 41 R